UNITED STATES PATENT OFFICE.

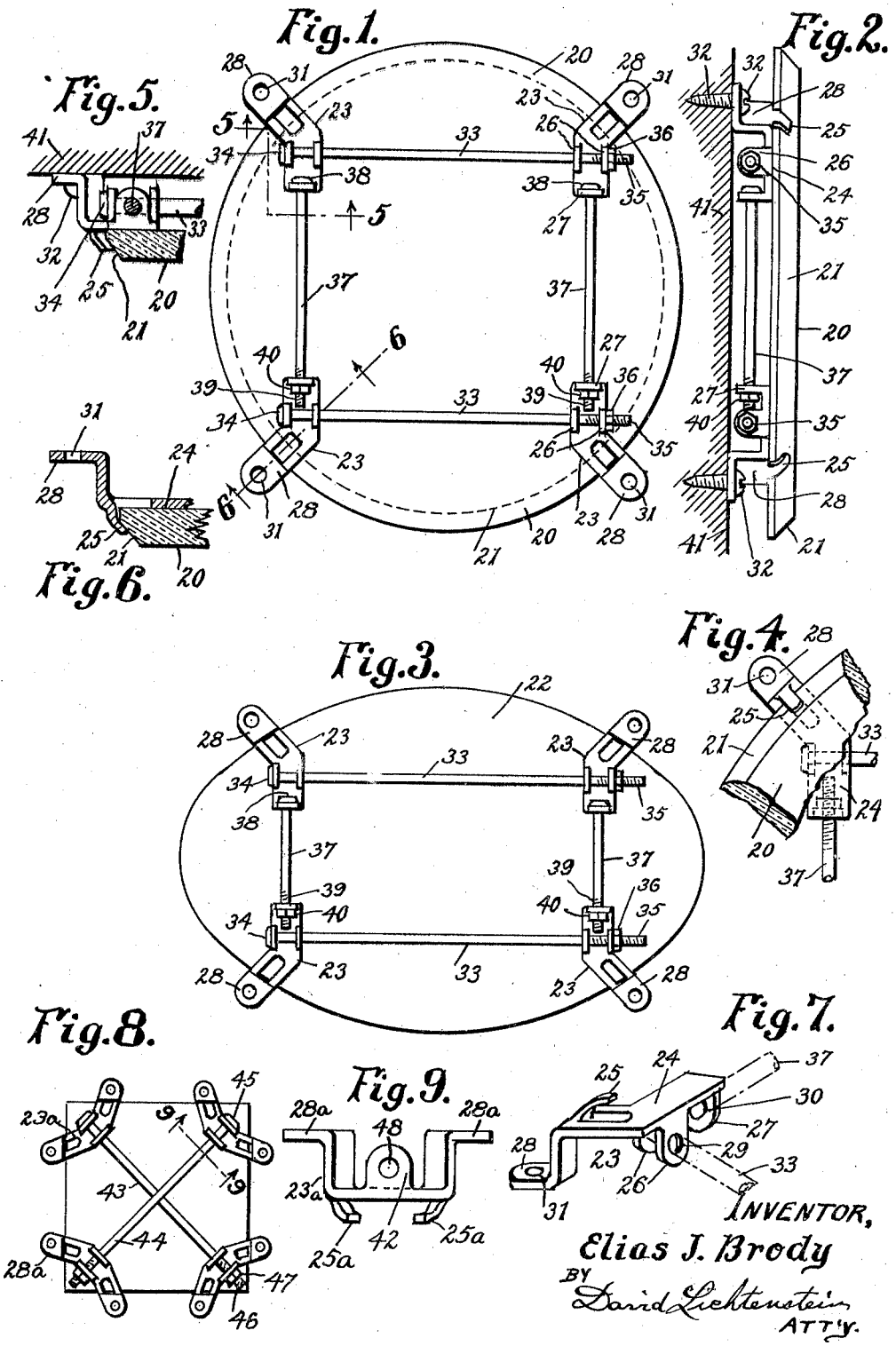

ELIAS J. BRODY, OF ROXBURY, MASSACHUSETTS.

SUPPORTING-FIXTURE FOR MIRRORS AND THE LIKE.

1,399,743.   Specification of Letters Patent.   Patented Dec. 13, 1921.

Application filed May 8, 1919. Serial No. 295,602.

*To all whom it may concern:*

Be it known that I, ELIAS J. BRODY, a citizen of the United States, and resident of Roxbury, in the county of Suffolk and State of Massachusetts, have invented a new and useful Improvement in Supporting-Fixtures for Mirrors and the like, of which the following is a specification.

The object of my invention is to provide a reinforcing and supporting fixture for frameless mirrors and is designed with clamping devices which engage the edge of the plate at distributed points about the same, said clamping devices being coupled together in the rear of the mirror by adjustable coupling rods for adjustably securing the fixture to the mirror and for reinforcing the latter.

Another object is to provide a fixture as above described, which is simple in construction, readily applicable to the different shapes of mirrors, hidden from view when secured to the mirror, and absolutely reliable in its capacity as a bracket for securely supporting the same.

Still another object is to provide a supporting bracket for mirrors which is hidden from view and which offsets the mirror supported thereby in a manner providing an air space between the back of the mirror and the surface of the supporting object, thereby effecting a sanitary feature which eliminates the possibility of the steaming up of the mirror due to change of heat or atmospheric conditions.

To these as well as other ends my invention consists of the novel features of construction, combination and arrangement of parts described in the following specification and particularly pointed out in the subjoined claims.

In order to illustrate the invention, I have shown the same applied to different shaped mirrors in the accompanying sheet of drawing, wherein:—

Figure 1 represents an elevational view of the rear of a circular-shaped mirror showing my device secured thereto;

Fig. 2 represents a right end view of Fig. 1, showing the device supporting the mirror therewith and secured to the wall or supporting object;

Fig. 3 represents an elevational view of the rear of an elliptical shaped mirror supplied with my device for supporting the same;

Fig. 4 represents a fragmentary elevational view of the front of a circular-shaped mirror showing a bracket member of the device engaging therewith;

Fig. 5 represents a view taken substantially on line 5—5 on Fig. 1 looking in the direction of the arrows;

Fig. 6 represents a sectional view taken on line 6—6 on Fig. 1;

Fig. 7 represents a perspective view of the bracket member shown in the above figure;

Fig. 8 represents a square-shaped mirror supplied with a modified type of bracket member; and Fig. 9 represents a view of the modified bracket member shown in Fig. 8 and taken on line 9—9 on said figure, with the mirror removed from the bracket.

The terms employed herein are used in the generic and descriptive sense to designate the elements illustrated and are therefore not specifically intended as terms of limitation.

Like numerals refer to like parts throughout the several views of the drawing.

The numeral 20 represents a circular-shaped mirror shown provided with the beveled edge 21 in Figs. 2 and 4. 22 (Fig. 3) represents an elliptical shaped mirror. 23 represents in its entirety a bracket member used in the device and shown in Figs. 1 to 7 inclusive, which is preferably provided with the mirror supporting base or face plate 24, the mirror engaging hook 25, the horizontal coupling member retaining lugs 26, the vertical coupling member retaining lug 27, and the bracket lug 28,—the lugs 26 and 27 being provided with the openings 29 and 30, respectively, for the coupling members, while the lug 28 is provided with the opening 31 for the bracket supporting screws 32. 33 represents the horizontal coupling members which may be provided with the heads 34 at one end and the threaded portions 35 at the other for accommodating the adjustable lock-nuts 36. Similarly 37 represents the vertical coupling members which may also be provided at one end with the retaining heads 38 and the threaded portions 39 at the other end for carrying the lock-nuts 40. It will here be noted that the aforesaid coupling members 33 and 37 may be threaded on both ends and supplied with lock-nuts instead of the heads 34 and 38.

41 represents the wall, or other supporting object, to which the device is secured for supporting the mirror. 23ª represents in its entirety the modified square cornered type of bracket member shown in Figs 8 and 9, which is provided with the angular coupling member lugs 42, the mirror engaging lugs 25ª, and the bracket supporting lugs 28ª. 43 and 44 represent the cross-bar coupling members which are preferably provided with the head ends 45 at one end thereof and threaded ends 46 at the other end thereof for carrying the lock-nut 47, as shown in Fig. 8, the coupling member lugs 42 being provided with the openings 48 for accommodating the coupling members 43 and 44.

It will be here noted that the bracket members of the device may be cast or stamped out of suitable metal, according as may be desired, and that the angularity of the face plate thereof may be made to suit the particular shape of mirror to effect an efficient and reliable gripping means for the device.

Having thus described the parts of my invention in detail, the manner in which the same may be employed is as follows:—

It will first be understood that the coupling members may be made of sufficient lengths according to the particular size or shape of mirror to be supported in the device; and for circular-shaped mirrors the bracket members 23 are preferably made right and left-handed as shown in Figs. 1 and 3, the diagonally opposite brackets being similar.

The bracket members 23 are set with the mirror surface 24 adjacent to the back of the mirror, and with the lug or hook 25 engaging with the beveled edge 21, said lug or hook 25 being bent preferably on an angle with the supporting surface 24 for setting adjacent to the beveled edge 21, as shown in Fig. 6. With the bracket members thus set in position about the mirror to be supported, the taking up of the lock-nuts 36 and 40 on the coupling members 33 and 37, respectively, will clamp said clamping members in secured position on the mirror and will then serve as a bracket for supporting the mirror in upright position on the wall or other supporting object, as shown in Fig. 2, or for supporting the mirror in horizontal position upon a table, or other such object, in which event the bracket will serve as a supporting stand therefor. In a similar manner the double type of clamping member 23ª may be preferably associated with square or rectangular shaped mirrors at or near the corners thereof for supporting the same, as shown in Fig. 8.

It will thus be observed that the device when coupled with a mirror may be secured thereto in a rigid manner and may thus become part thereof and serve as a reinforcing means for the mirror as well as a supporting means therefor.

The device is simple in construction and is absolutely strong and durable in every regard and capable of supporting heavy so-called French plate frameless mirrors.

The device further serves to establish a sanitary feature for the mirror, in that it offsets the same from the supporting object and thus forms an air space behind the mirror which prevents the mirror surface from becoming moist or steam coated, as is a usual occurrence with mirrors lacking the air space. This offset feature serves further to hold the mirror away from the supporting object in relief; the same thus stands out more prominently and adds to the appearance of the mirror, besides increasing the life thereof by reason of the air circulation occurring against the back of the mirror which is coated to cause the reflection.

As another sanitary feature it will be observed that the entire mirror surface, as well as the edge of the mirror, are practically free from fittings with the exception of the engaging lugs 25, which may be made comparatively small and which expose the whole mirror for cleansing purposes, the offset feature of the mirror also preventing the smutting up or marring of the object supporting the same with the cleansing materials, as is common with frameless mirrors which are set and supported adjacent to the supporting object.

Having thus described my invention in detail, what I claim as new is:

1. A device of the character described, comprising angularly disposed bracket members provided with face plates adapted to set adjacent to the back of the mirror and at the edge thereof and having hooked members projecting from said face plates for engaging the edge of the mirror, and depending coupling member lugs and bracket supports projecting from said bracket members and in opposite direction to said hooked members; and adjustable coupling members adapted to engage with said depending coupling member lugs for coupling said bracket members together and for holding the same rigidly secured to the mirror for supporting the same in the device.

2. A bracket member having a flat surface adapted to set adjacent with the supported object, a hooked member projecting from said flat surface and adapted to engage with the edge of said supported object, depending coupling lugs projecting on said bracket member in opposite position to said hooked member and adapted to engage with coupling members for clamping said bracket in position with said supported object, and a depending supporting standard projecting from said bracket member in a similar direction to said depending coupling lugs and adapted to engage said bracket member with a supporting object for supporting the supported object.

In testimony whereof, I hereunto set my hand this sixth day of May, 1919.

ELIAS J. BRODY.

Witnesses:
BERNARD J. BRODY,
D. LICHTENSTEIN.